US008916989B2

(12) United States Patent
Lin

(10) Patent No.: US 8,916,989 B2
(45) Date of Patent: Dec. 23, 2014

(54) MULTI-PURPOSE VEHICLE CAPABLE OF SUPPLYING ELECTRICITY TO EXTERNAL ELECTRICAL APPLIANCES

(75) Inventor: Chuang-Hsiung Lin, Kaohsiung (TW)

(73) Assignee: Kwang Yang Motor Co., Ltd, Kaohsiung (TW)

( * ) Notice: Subject to any disclaimer, the term of this patent is extended or adjusted under 35 U.S.C. 154(b) by 582 days.

(21) Appl. No.: 13/180,583

(22) Filed: Jul. 12, 2011

(65) Prior Publication Data

US 2012/0175950 A1     Jul. 12, 2012

(30) Foreign Application Priority Data

Jul. 14, 2010   (TW) .............................. 99123156 A

(51) Int. Cl.
    *B60L 1/00*           (2006.01)
(52) U.S. Cl.
    USPC ........................................................... 307/9.1

(58) Field of Classification Search
    USPC ........................................................... 307/9.1
    See application file for complete search history.

(56) References Cited

U.S. PATENT DOCUMENTS

| 6,157,175 A * | 12/2000 | Morinigo et al. ............... 322/28 |
| 2006/0089233 A1 * | 4/2006 | Sekita et al. ..................... 477/84 |
| 2009/0166108 A1 * | 7/2009 | Gross et al. ................. 180/65.21 |

\* cited by examiner

*Primary Examiner* — Robert L. DeBeradinis
(74) *Attorney, Agent, or Firm* — Ohlandt Greeley Ruggiero & Perle L.L.P.

(57) ABSTRACT

A multi-purpose vehicle includes a frame, two aligned seats, an engine, a first generator driven by the engine, and a second generator driven by the engine. The frame includes two side frame portions, a base connected between the side frame portions, and two seat supports disposed on the base for supporting the seats, respectively. The second generator is disposed on the base and under one of the seats for supplying electricity to external electrical appliances.

4 Claims, 7 Drawing Sheets

MULTI-PURPOSE VEHICLE CAPABLE OF SUPPLYING ELECTRICITY TO EXTERNAL ELECTRICAL APPLIANCES

CROSS-REFERENCE TO RELATED APPLICATION

This application claims priority of Taiwanese Application No. 099123156, filed on Jul. 14, 2010.

BACKGROUND OF THE INVENTION

1. Field of the Invention

This invention relates to a multi-purpose vehicle, and more particularly to a multi-purpose vehicle capable of supplying electricity to external electrical appliances.

2. Description of the Related Art

Referring to FIG. 1, a conventional multi-purpose vehicle 100 (such as a golf cart or a farm vehicle) includes a generator driven by an engine to supply electricity to components of the multi-purpose vehicle 100, for example, vehicle lamps.

However, external electrical appliances are usually carried by the user, and are used on the multi-purpose vehicle 100. In a situation where the external electrical appliances are used on the multi-purpose vehicle 100, it is necessary to prepare an additional generator for supplying electricity to the external electrical appliances, thereby resulting in inconvenience during use of the multi-purpose vehicle 100.

SUMMARY OF THE INVENTION

The object of this invention is to provide a multi-purpose vehicle that can supply electricity to external electrical appliances.

According to this invention, there is provided a multi-purpose vehicle comprising an outer shell, a frame coated with said outer shell, two seats disposed on the frame and aligned with and spaced apart from each other, an engine disposed on the frame, a first generator disposed on the frame and driven by the engine, and a second generator disposed on the frame and driven by the engine, wherein the frame includes: two side frame portions spaced apart from each other; a base including a bottom rod connected between the two side frame portions, and a chassis connected among the two side frame portions and the bottom rod; and two spaced-apart seat supports disposed on the chassis for supporting the seats, respectively, each of the seat supports cooperating with the chassis to define an accommodating space, the second generator being disposed on the chassis, under one of the seats, and within the accommodating space defined by a corresponding one of the seat supports and the chassis, the second generator being covered by the outer shell and the one of the seats.

The multi-purpose vehicle of this invention has an effect in that, since the second generator is disposed on the chassis and under the one of the seats for supplying electricity to external electrical appliances, an interior space of the multi-purpose vehicle can be utilized effectively, and the second generator can be protected by the outer shell and one of the side frame portions from water, dust, and collision.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
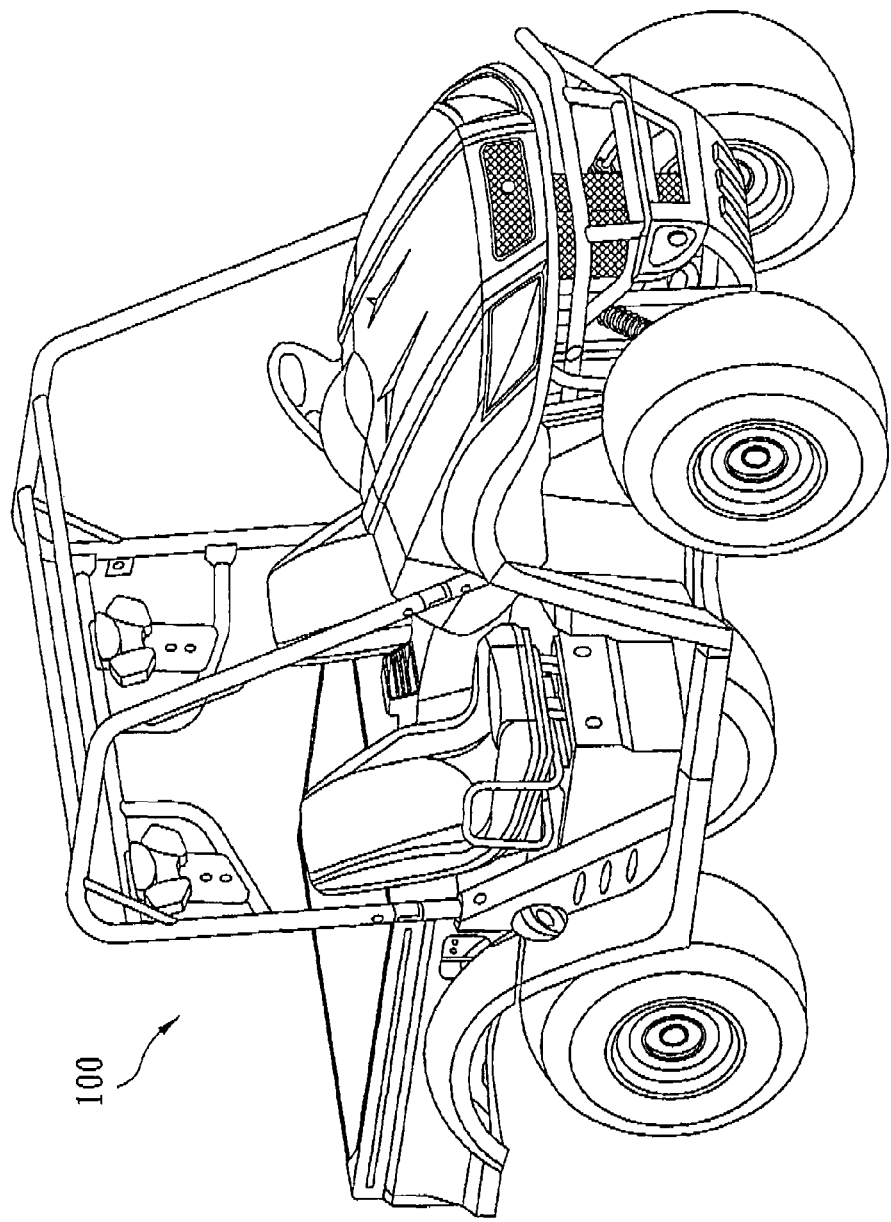
FIG. 1 is a perspective view of a conventional multi-purpose vehicle.
Figure 2:
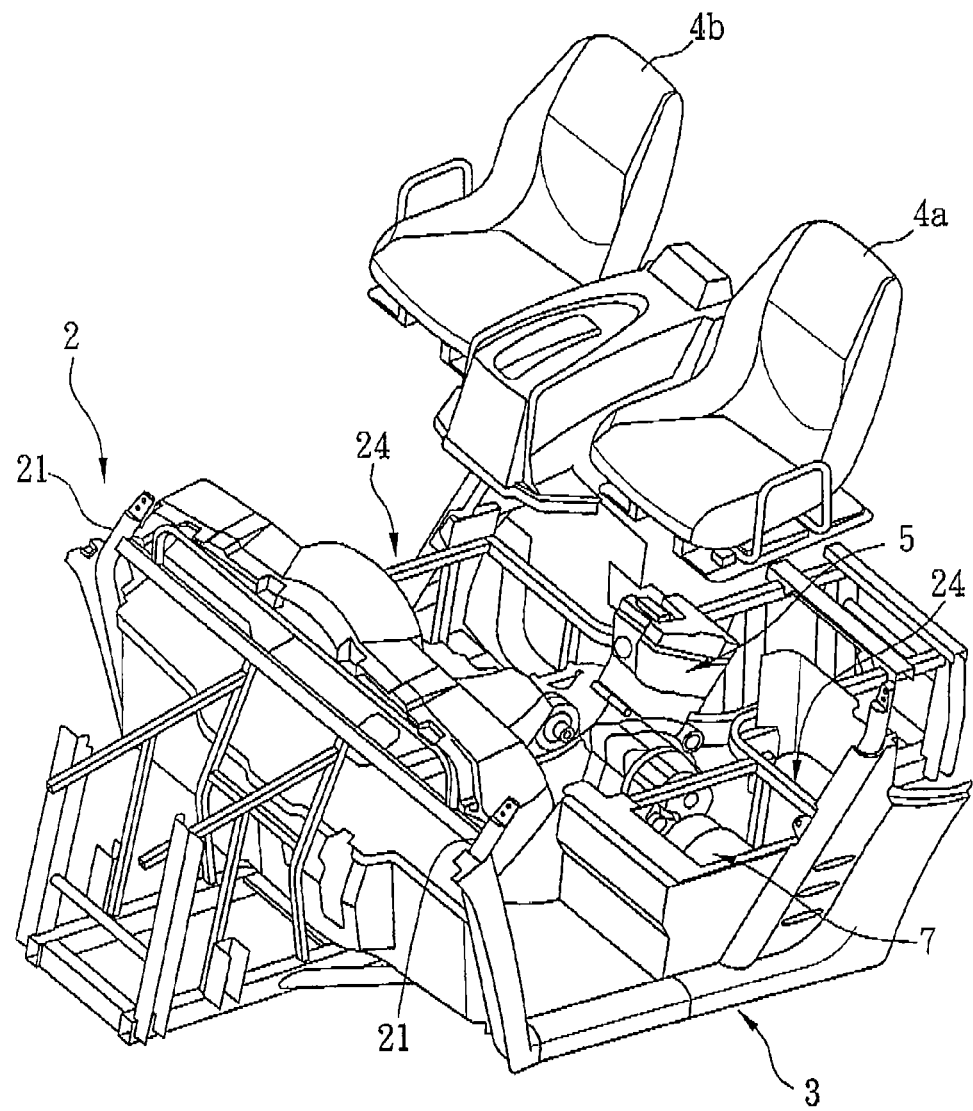
FIG. 2 is a fragmentary, partly exploded perspective view of the preferred embodiment of a multi-purpose vehicle according to this invention.
Figure 3:
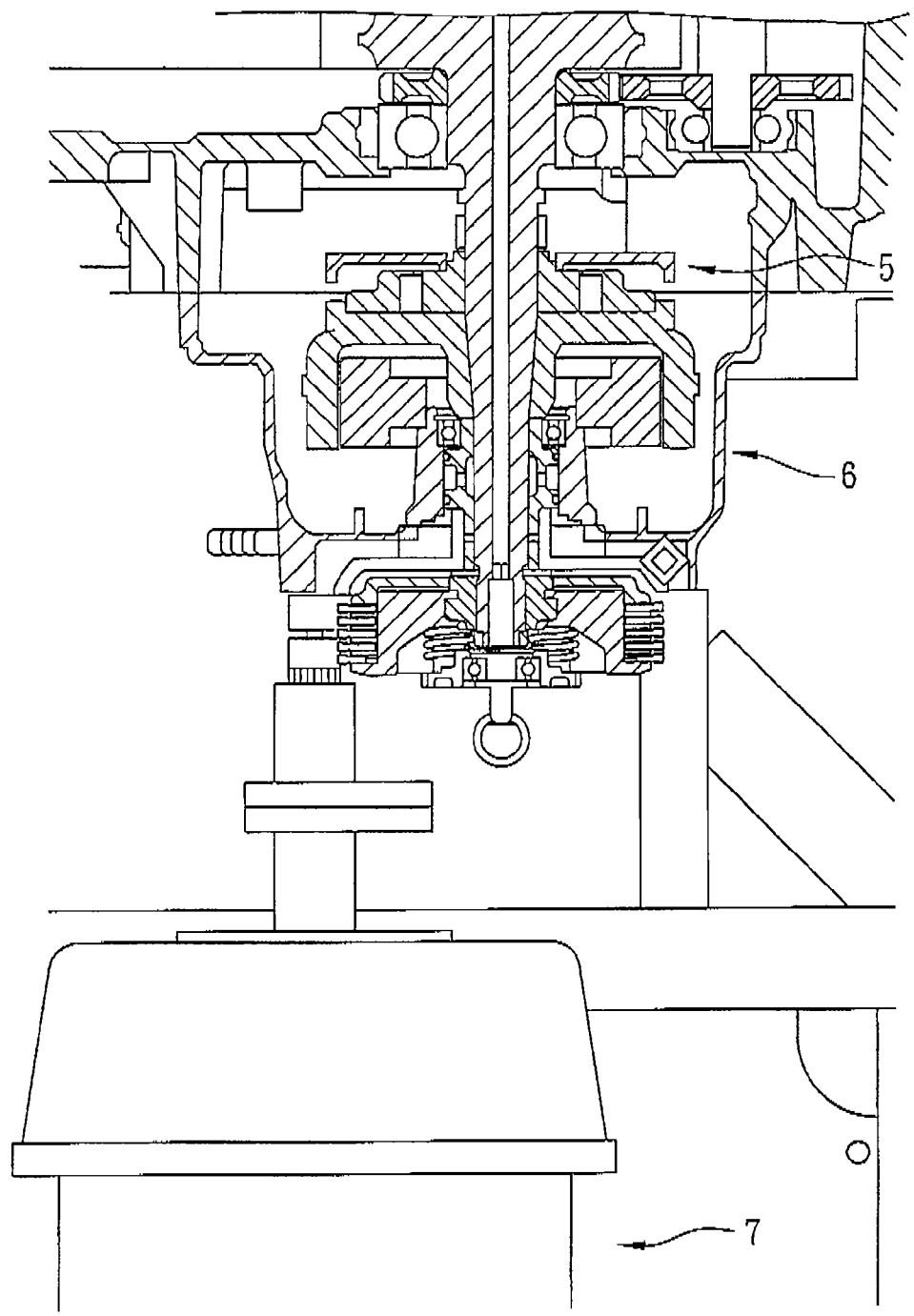
FIG. 3 is a fragmentary, schematic, partly sectional view of the preferred embodiment, illustrating relative position between first and second generators.

Referring to FIGS. 2 and 3, the preferred embodiment of a multi-purpose vehicle according to this invention includes an outer shell 3, a frame 2 coated with the outer shell 3, a pair of first and second seats 4a, 4b (i.e., a driver seat 4a and a passenger seat 4b) disposed on the frame 2 and aligned with and spaced apart from each other, an engine 5 disposed on the frame 2, a first generator 6 disposed on the frame 2 and driven by the engine 5, and a second generator 7 disposed on the frame 2 and driven by the engine 5. The first generator 6 supplies electricity to electrical devices (not shown) of the multi-purpose vehicle, such as vehicle lamps. The second generator 7 supplies electricity to external electrical appliances.

Figure 4:
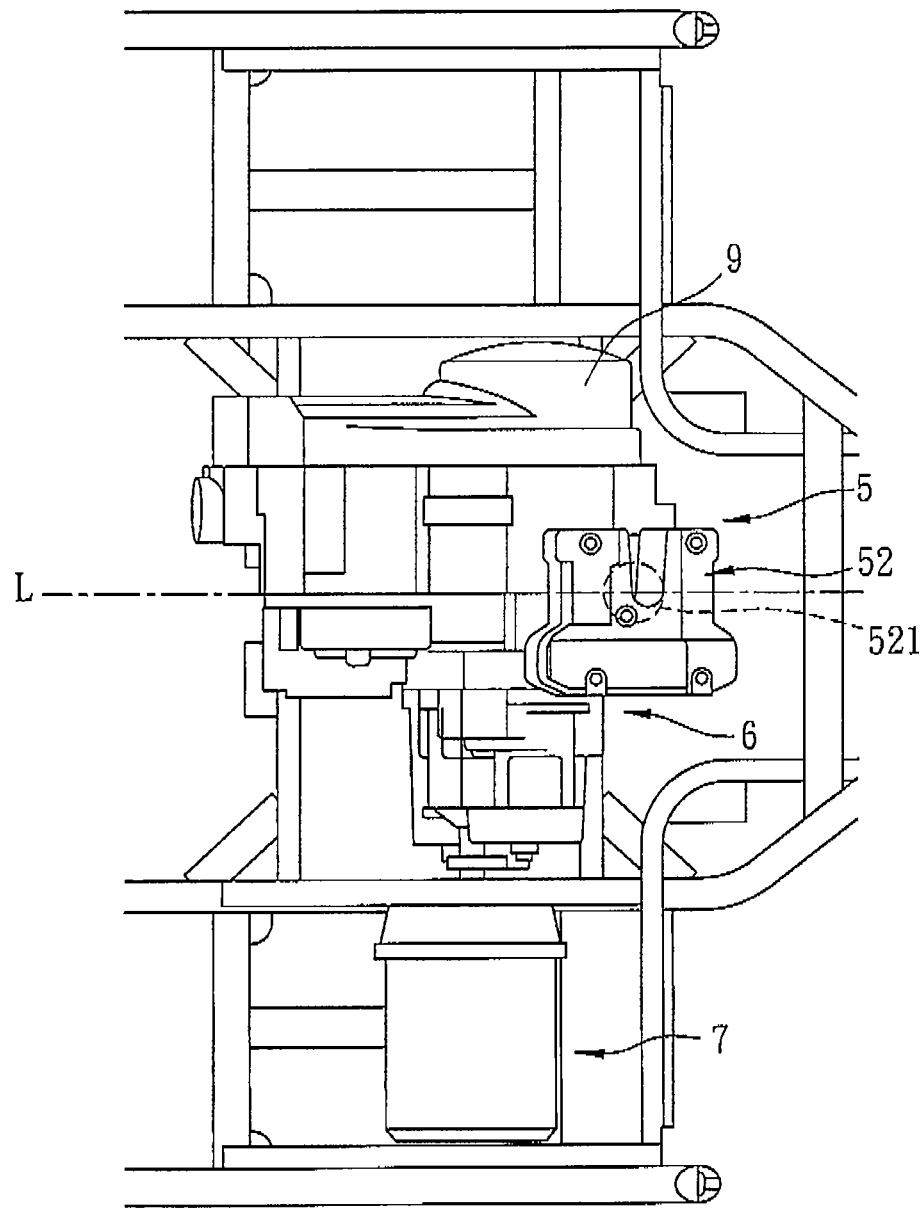
FIG. 4 is a fragmentary top view of the preferred embodiment, illustrating that the first and second generators are disposed at the same side of a line extending through a center of a cylinder bore in an air cylinder along a front-to-rear direction of the vehicle.

With further reference to FIG. 4, the engine 5 includes an air cylinder 52 formed with a cylinder bore 521. The first and second generators 6, 7 are disposed at the same side of a line (L) extending through a center of the cylinder bore 521 along a front-to-rear direction of the multi-purpose vehicle. A transmission box 9 is disposed at the other side of the line (L), so as to balance the weight distribution of the multi-purpose vehicle.

Figure 5:
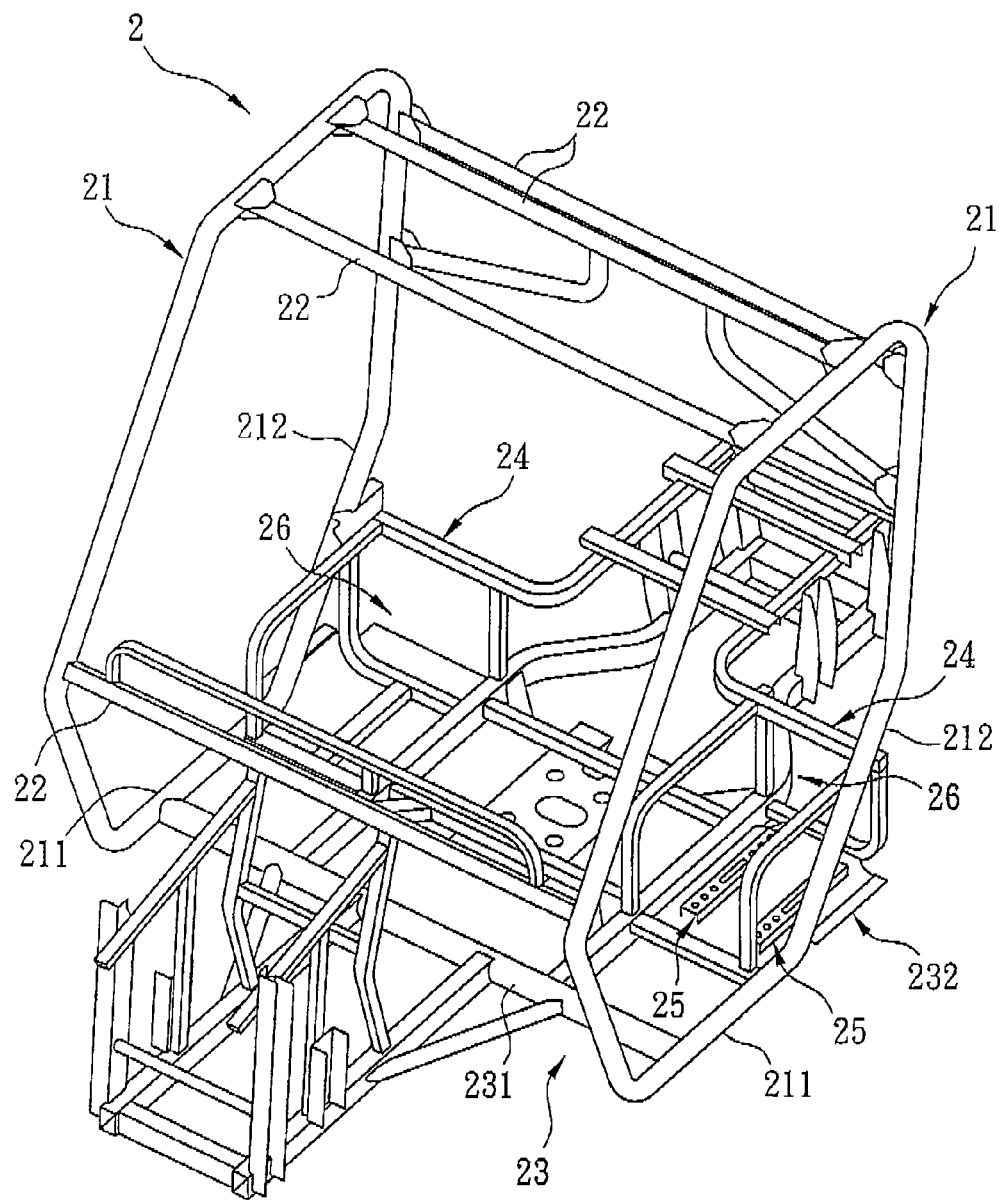
FIG. 5 is a perspective view of a frame of the preferred embodiment.

With further reference to FIG. 5, the frame 2 includes two side frame portions 21 spaced apart from each other, a plurality of connecting rods 22 connected between the side frame portions 21, a base 23 connected between the two side frame portions 21, two spaced-apart seat supports 24 disposed on the base 23 for supporting the first and second seats 4a, 4b, respectively, and two spaced-apart positioning members 25 disposed on the base 23 and under one of the seat supports 24.

The base 23 includes a bottom rod 231 connected between the two side frame portions 21, and a chassis 232 connected among the two side frame portions 21 and the bottom rod 231. The seat supports 24 are disposed on the chassis 232. Each of the seat supports 24 cooperates with the chassis 232 to define an accommodating space 26. The two positioning members 25 are disposed on the chassis 232 and within one of the accommodating spaces 26.

Figure 6:
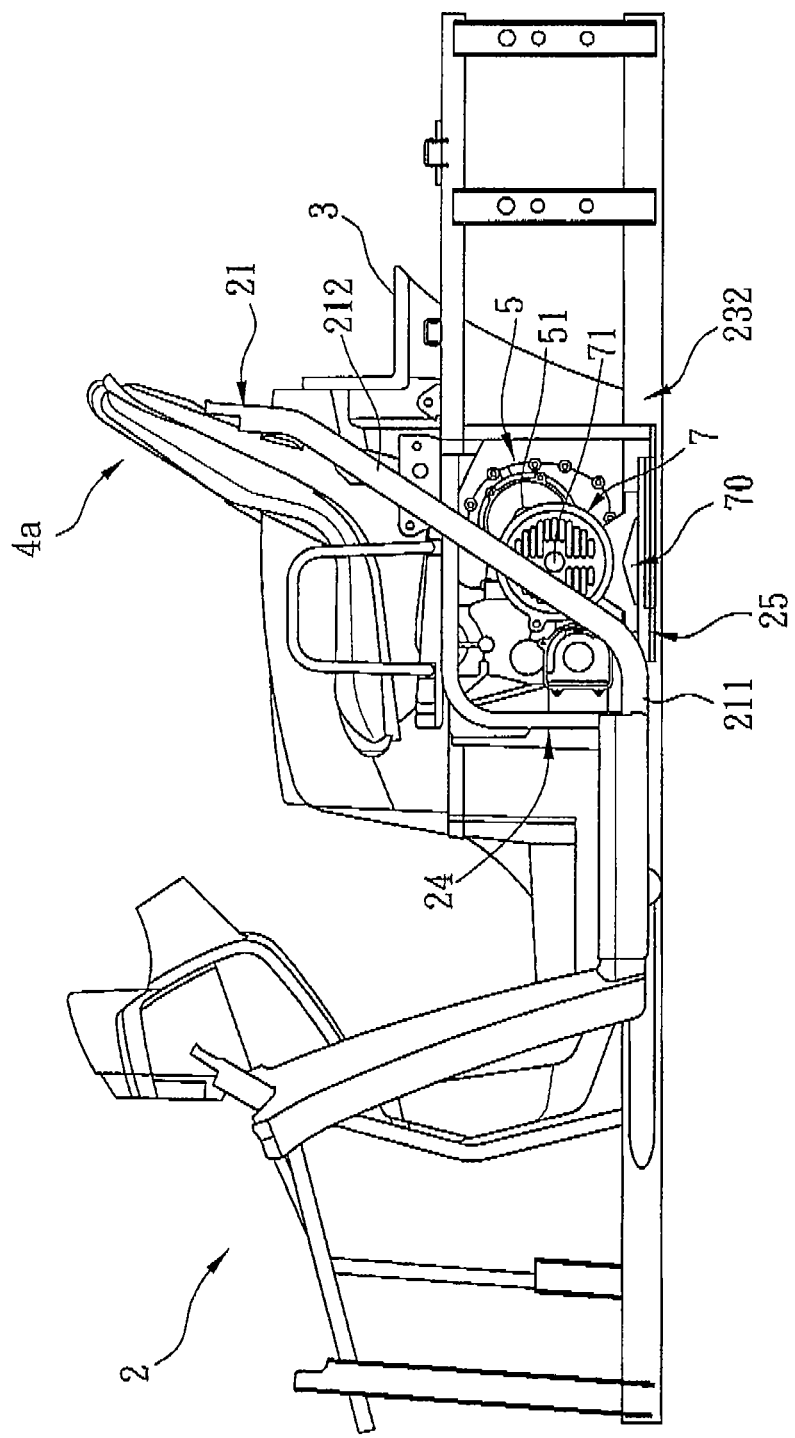
FIGS. 6 and 7 are fragmentary schematic side views of the preferred embodiment.

With further reference to FIGS. 5 and 6, each of the side frame portions 21 includes a bottom side section 211 connected to the bottom rod 231 and the chassis 232, and a stop section 212 extending rearwardly and upwardly from a rear end of the bottom side section 211. The seat supports 24 are disposed between the stop sections 212.

With further reference to FIG. 6, the second generator 7 includes two supporting members 70 (only one is shown in FIG. 6) mounted respectively and removably on the positioning members 25. As such, the second generator 7 is disposed on the chassis 232. The number of the supporting members 70 and the positioning members 25 may be changed.

It should be noted that, the engine 5 further includes an output shaft 51. The second generator 7 includes an input shaft 71 connected to the output shaft 51. The input and output shafts 51, 71 are disposed behind and adjacent to the stop sections 212 of the side frame portions 21, such that they are adjacent to each other, thereby facilitating smooth operation of the second generator 7.

With particular reference to FIGS. 2 and 6, in this embodiment, the positioning members 25 and the second generator 7 are disposed under the first seat 4a, and a fuel tank (not shown) is disposed under the second seat 46. Alternatively, the positions of the fuel tank and an assembly of the positioning members 25 and the second generator 7 relative to the first and second seats 41, 4b may be exchanged.

Figure 7:
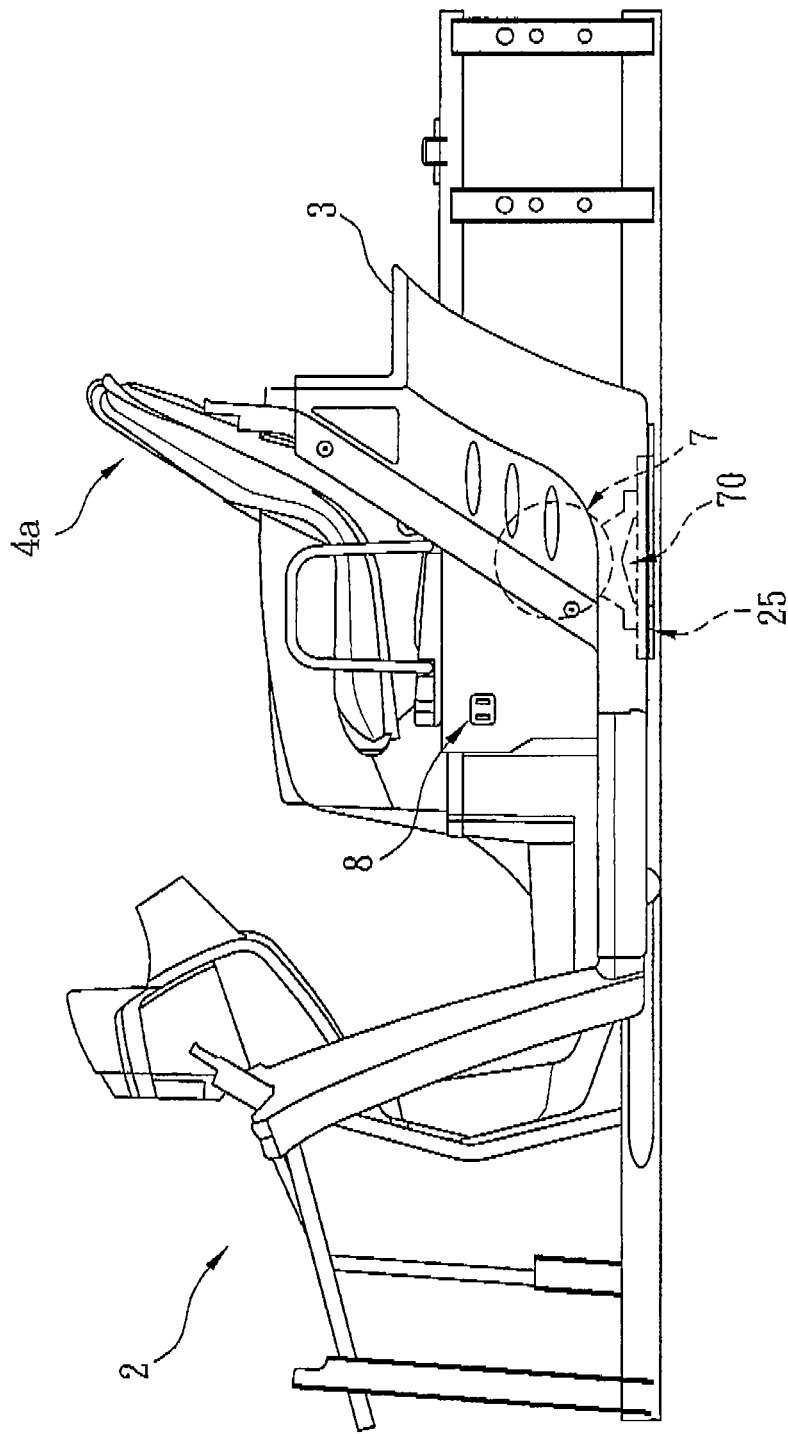

With further reference to FIG. 7, the multi-purpose vehicle further includes an electrical connector 8 disposed on the outer shell 3 and electrically connected to the second generator 7. The electrical connector 8 is located under the first seat 4a, and is adjacent to the second generator 7. In this embodiment, the electrical connector 8 is configured as an electrical socket. The second generator 7 can supply electricity to any of the external electrical appliances as long as the electrical connector 8 is electrically connected to the same.

In view of the above, the second generator 7 is driven by the engine 5 for supplying electricity to the external electrical appliances, thereby utilizing an interior space in the multi-purpose vehicle and resulting in convenience during use of the multi-purpose vehicle. Furthermore, the second generator 7 is covered and protected by the outer shell 3 and the left side frame portion 21 from water, dust, and collision.

With this invention thus explained, it is apparent that numerous modifications and variations can be made without departing from the scope and spirit of this invention. It is therefore intended that this invention be limited only as indicated by the appended claims.

I claim:

1. A mufti-purpose vehicle comprising an outer shell, a frame coated with said outer shell, two seats disposed on said frame and aligned with and spaced apart from each other, an engine disposed on said frame, a first generator disposed on said frame and driven by said engine, and a second generator disposed on said frame and driven by said engine, wherein said frame includes:

two side frame portions spaced apart from each other;

a base including a bottom rod connected between said two side frame portions, and a chassis connected among said two side frame portions and said bottom rod; and two spaced-apart seat supports disposed on said chassis for supporting said seats, respectively, each of said seat supports cooperating with said chassis to define an accommodating space, said second generator being disposed on said chassis, under one of said seats, and within said accommodating space defined by a corresponding one of said seat supports and said chassis, said second generator being covered by said outer shell and the one of said seats; and at least one positioning member disposed on said chassis and under the corresponding one of said seat supports and permitting said second generator to be disposed thereon;

wherein said second generator includes at least one supporting member mounted removably on said positioning member;

wherein each of said side frame portions includes a bottom side section connected to said bottom rod and said chassis, and a stop section extending rearwardly and upwardly from a rear end of said bottom side section, said seat supports being disposed between said stop sections of said side frame portions;

wherein said second generator includes at least one supporting member mounted removably on said positioning member;

wherein said engine includes an air cylinder formed with a cylinder bore, said first and second generators being disposed at a side of a line extending through a center of said cylinder bore along a front-to-rear direction of said multi-purpose vehicle, said mufti-purpose vehicle further comprising a transmission box disposed at the other side of the line.

2. The mufti-purpose vehicle as claimed in claim 1, wherein said engine includes an output shaft, and said second generator includes an input shaft connected to said output shaft, said input shaft and said output shaft being disposed behind said stop sections of said side frame portions.

3. The mufti-purpose vehicle as claimed in claim 1, further comprising a plurality of connecting rods connected between said side frame portions.

4. The multi-purpose vehicle as claimed in claim 1, further comprising an electrical connector disposed on said outer shell and electrically connected to said second generator, said electrical connector being located under the one of said seats and being adjacent to said second generator.

* * * * *